2,713,581
Patented July 19, 1955

2,713,581

CERTAIN TETRAZOLIUM SALTS AND PROCESS FOR PREPARING THEM

Laura J. Pannone, Farmington, Conn., and John B. Rust, East Hanover, N. J., assignors, by direct and mesne assignments, of one-half to Montclair Research Corporation and one-half to Ellis-Foster Company, both corporations of New Jersey No Drawing. Application February 23, 1949, Serial No. 78,008

20 Claims. (Cl. 260—308)

The present invention relates to tetrazolium salts, to intermediates such as formazans for the production of tetrazolium salt, and methods of producing such salts and such formazans.

It is known that tetrazolium salts may be formed by the oxidation of a substituted formazan under anhydrous conditions with amyl nitrite in the presence of hydrogen chloride. This process requires the use of the relatively dangerous, and expensive compound, amyl nitrite, in the presence of alcoholic hydrogen chloride; and is not well adapted to large scale or industrial processes. Another relatively new laboratory process effects the oxidation of a substituted formazan under anhydrous conditions with lead tetracetate. This process however employs a relatively expensive chemical and an extra purification step must be employed to separate the tetrazolium salt which is formed from the lead acetate and chloride.

Among the objects of the present invention is the production of tetrazolium salts by relatively simple and economical and safe methods.

Other objects include methods of producing tetrazolium salts by rapid simple and economical processes readily adapted to the commercial synthesis of such compounds.

Other objects include methods of effecting the oxidation of a substituted formazan into a substituted tetrazolium salt in a simple and economical manner.

Still further objects include the production of tetrazolium salts whose reduction products are intensely colored, having a color different from human and animal blood and tissue, and having therapeutic and diagnostic value.

Further objects include the production of substituted tetrazolium salts having reduced toxicity for the animal and human body and having bacteriostatic properties.

Still further objects include the production of substituted tetrazolium salts having the specific property of being more readily reduced by neoplastic and supravital tissue such as malignant tumors, cancer tissue and the like.

Still further objects include the production of substituted tetrazolium derivatives which have diagnostic value for excised neoplastic and supravital tissue in order to detect quickly the presence of such tissue in normal tissue.

Still further objects include the production of new types of substituted formazans which may be readily converted into substituted tetrazolium salt having the properties and characteristics set forth above.

Still further objects and advantages in the present invention will appear from the more detailed description set forth below, it being understood that such more detailed description is given by way of illustration and explanation only, and not by way of limitation, since various changes therein may be made by those skilled in the art without departing from the scope and spirit of the present invention.

The present invention is particularly directed to the production of tetrazolium salts having the general formula

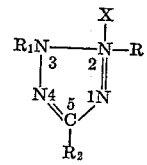

in which R is a radical of a diazotizable amine usually aryl or its equivalent, $R_1$ is an aryl or equivalent group, for example as derived from monoaryl hydrazines, while $R_2$ is a monovalent organic radical which may be aliphatic, carbocyclic, cycloaliphatic, or heterocyclic derived for example from aldehydes containing the stated groups attached to the aldehyde group. In referring to R and $R_1$ as aryl, the term is not limited to the benzene ring but includes rings having aromatic properties, that is, for example, rings which when containing a substituent amino group may be diazotized to form a relatively stable diazonium salt, including for example, the pyridine, pyrazine, thienyl, furyl, etc., rings. $R_2$ may be aryl, alkyl, aralkyl, alkaryl, cycloaliphatic, and heterocyclic as for example furyl.

The group R stated above to be aryl whether monocyclic or polycyclic, or its equivalent may contain substituent groups including alkyl, aryl, alkaryl, aralkyl, cycloaliphatic, halogen, sulfonic acid, phosphoric acid, arsenic groups and antimony groups such as arseno, arsono, stibino, stibono, etc., and so too for the group $R_1$.

Particularly important derivatives in the form of bis-tetrazolium derivatives may be produced in those cases where R is the residue of an aryl diamine which bis derivatives may be generally characterized by the formula

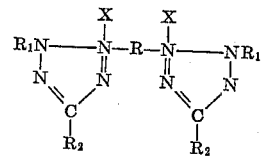

in which R, $R_1$ and $R_2$ have the values set forth above. The bis aryl derivatives of the tetrazolium compounds and their alkyl derivatives especially the 5-alkyl derivatives are particularly important. This is also the case with the 5-alkyl derivatives of the straight tetrazolium compounds which may be produced by the oxidation of the corresponding formazan. In all of the tetrazolium derivatives set forth above including those in the first formulation and those of the bis type X is an anion commonly an acid radical, which may be either inorganic such as chloride, sulfate, phosphate, nitrate, etc., or organic including aliphatic and aromatic acids such as the fatty acids acetic, propionic, and higher fatty acids, hydroxy aliphatic acids, such as tartaric, citric, etc., aromatic acids like benzoic, naphthoic, etc., and dibasic and polybasic acids both aliphatic and aromatic including maleic, fumaric, malonic, succinic, sebacic, adipic, etc., phthalic, etc.

The tetrazolium salts of the character set forth above are readily produced from corresponding substituted formazans having the general formula

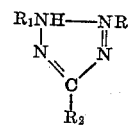

in which R, $R_1$ and $R_2$ have the values set forth above in the formulations there given, these formazans being used in the production of the tetrazolium derivatives by oxidation.

To illustrate specific examples of substituted formazans which may be oxidized readily to substituted tetrazolium salts in accordance with the present invention and taking the formula $$R_1NH-N=C(R_2)-N=NR$$

R and $R_1$ may be phenyl, tolyl, xylyl, naphthyl, etc., pyridyl, pyrazyl, thienyl, furyl, etc., and $R_2$ may be methyl, ethyl, propyl, isopropyl, butyl, isobutyl, amyl, hexyl, heptyl octyl nonyl, decyl, dodecyl, etc., cyclobutyl, cyclopentyl, cyclohexyl, etc., phenyl, tolyl, xylyl, naphthyl, benzyl, xylylene, and heterocyclic such as furyl; and R in addition to being phenyl, tolyl, xylyl, etc., as set forth above, may be the radicals attached to diazonium or tetrazonium derivatives of o, p′ diaminodiphenyl, benzidine, α-naphthylamine, β-naphthylamine, p-aminodiphenyl, o-aminodiphenyl, m-aminodiphenyl, o, o′ diaminodiphenyl, o-phenylenediamine, p-phenylenediamine, diaminonaphthalenes, including 1,4 diaminonaphthalene, 1,5 diaminonaphthalene, and 1,8 diaminonaphthalene, o-tolidine, o-toluidine, mm′ diaminodiphenyl, m-tolidine, m-toluidine, o-methyl benzidine, o-dianisidine, ethoxybenzidine, oo′ diamino-stilbene, pp′ diamino-stilbene, diamino-stilbene disulfonic acids, diaminophenyl-methane, pp′ diamino-diphenyl-methane, aminoterphenyl, etc.

The formazans are also called formazyl derivatives, thus triphenyl formazan is also called diphenyl formazyl benzene. Diphenyl formazan, diphenyl methyl formazan, diphenyl propyl formazan, diphenyl benzyl formazan, diphenyl hexyl formazan, diphenyl undecyl formazan, diphenyl tolyl formazan, diphenyl cyclohexyl formazan, diphenyl cyclohexenyl formazan, phenylene bis (diphenyl formazan), diphenylene bis (diphenyl formazan) may also be called by the formazyl method of nomenclature, respectively. As exemplary of formazans that may be treated in accordance with the present invention there may be mentioned: formazyl, methyl formazyl, propyl formazyl, benzyl formazyl, hexyl formazyl, undecyl formazyl, tolyl formazyl, cyclohexyl formazyl, cyclohexenyl formazyl, phenylene bis-formazyl, diphenylene bis-formazyl, dichlorophenyl formazan, di-chlorophenyl methyl formazan, di-chlorophenyl propyl formazan, di-chlorophenyl benzyl formazan, di-chlorophenyl hexyl formazan, di-chlorophenyl undecyl formazan, di-chlorophenyl tolyl formazan, di-chlorophenyl cyclohexyl formazan, di-chlorophenyl cyclohexenyl formazan, phenylene bis (dichlorophenyl formazan), diphenylene bis (dichlorophenyl formazan), dinitrophenyl formazan, dinitrophenyl methyl formazan, dinitrophenyl propyl formazan, dinitrophenyl benzyl formazan, dinitrophenyl hexyl formazan, dinitrophenyl undecyl formazan, dinitrophenyl-tolyl formazan, dinitrophenyl cyclohexyl formazan, dinitrophenyl cyclohexanyl formazan, phenylene bis (dinitrophenyl formazan), diphenylene bis (dinitrophenyl formazan), di-carboxymethylphenyl formazan, di-carboxymethylphenyl methyl formazan, di-carboxymethylphenyl propyl formazan, di-carboxymethylphenyl benzyl formazan, di-carboxymethylphenyl hexyl formazan, di-carboxymethylphenyl undecyl formazan, di-carboxymethylphenyl tolyl formazan, di-carboxymethylphenyl cyclohexyl formazan, di-carboxymethylphenyl cyclohexenyl formazan, phenylene bis (di-carboxymethylphenyl formazan), diphenylene bis (di-carboxymethylphenyl formazan), di-methoxyphenyl formazan, di-methoxyphenyl methyl formazan, di-methoxyphenyl propyl formazan, di-methoxyphenyl benzyl formazan, di-methoxyphenyl hexyl formazan, di-methoxyphenyl undecyl formazan, di-methoxyphenyl tolyl formazan, di-methoxyphenyl cyclohexyl formazan, di-methoxyphenyl cyclohexenyl formazan, phenylene bis (di-methoxyphenyl formazan), diphenylene bis (di-methoxyphenyl formazan); chlorophenyl, phenyl formazan; chlorophenyl, phenyl methyl formazan; chlorophenyl, phenyl propyl formazan; chlorophenyl, phenyl benzyl formazan; chlorophenyl, phenyl hexyl formazan; chlorophenyl, phenyl undecyl formazan; chlorophenyl, phenyl tolyl formazan; chlorophenyl, phenyl cyclohexyl formazan; chlorophenyl, phenyl cyclohexenyl formazan; phenylene bis (chlorophenyl, phenyl formazan), diphenylene bis (chlorophenyl, phenyl formazan); methoxyphenyl, phenyl formazan; methoxyphenyl, phenyl methyl formazan; methoxyphenyl, phenyl propyl formazan; methoxyphenyl phenyl benzyl formazan; methoxyphenyl, phenyl hexyl formazan; methoxyphenyl, phenyl undecyl formazan; methoxyphenyl, phenyl tolyl formazan; methoxyphenyl, phenyl cyclohexyl formazan; methoxyphenyl, phenyl cyclohexenyl formazan; phenylene bis (methoxyphenyl phenyl formazan), di-phenylene bis (methoxyphenyl, phenyl formazan); chlorophenyl, phenyl formazan; chlorophenyl, phenyl methyl formazan; chlorophenyl, phenyl propyl formazan; chlorophenyl, phenyl benzyl formazan; chlorophenyl, phenyl hexyl formazan; chlorophenyl, phenyl undecyl formazan, chlorophenyl, phenyl tolyl formazan; chlorophenyl, phenyl cyclohexyl formazan; chlorophenyl, phenyl cyclohexenyl formazan; phenylene bis (chlorophenyl, phenyl formazan), diphenylene bis (chlorophenyl, phenyl formazan), di-phenylene bis (diphenyl formazan) diphenylene bis (phenyl formazyl benzene), diphenyl pyrazyl formazan, diphenyl β-pyridyl formazan, diphenyl furyl formazan, diphenyl thienyl formazan, trithienyl formazan, diphenyl pteroyl formazan, triphenyl formazan tricarboxylic acid, diphenyl arsenophenyl formazan, diphenyl naphthyl formazan, stilbene bis (diphenyl formazan), diphenyl butadiene bis (diphenyl formazan).

Any of the formazans as set forth above may be oxidized in accordance with the present invention to corresponding tetrazolium salts including by way of specific example using the chloride for convenience: 2,3-diphenyl tetrazolium chloride, 2,3-diphenyl 5-methyltetrazolium chloride, 2,3-diphenyl 5-propyl tetrazolium chloride, 2,3-diphenyl 5-benzyl tetrazolium chloride, 2,3-diphenyl 5-hexyl tetrazolium chloride, 2,3-diphenyl 5-undecyl tetrazolium chloride, 2,3-diphenyl 5-tolyl tetrazolium chloride, 2,3-diphenyl 5-cyclohexyl tetrazolium chloride, 2,3-diphenyl 5-cyclohexenyl tetrazolium chloride, phenylene bis 5(2,3 diphenyl tetrazolium chloride), diphenylene bis 5(2,3 diphenyl tetrazolium chloride), 2,3-dichlorophenyl 2(3,5 diphenyl tetrazolium chloride), 2,3-dichlorophenyl tetrazolium chloride, 2,3-dichlorophenyl 5-methyl tetrazolium chloride, 2,3-dichlorophenyl 5-propyl tetrazolium chloride, 2,3-dichlorophenyl 5-propyl tetrazolium chloride, 2,3-dichlorophenyl 5-benzyl tetrazolium chloride, 2,3-dichlorophenyl 5-hexyl tetrazolium chloride, 2,3-dichlorophenyl 5-undecyl tetrazolium chloride, 2,3-dichlorophenyl 5-tolyl tetrazolium chloride, 2,3-dichlorophenyl 5-cyclohexyl tetrazolium chloride, 2,3-dichlorophenyl 5-cyclohexenyl tetrazolium chloride, phenylene bis 5(2,3 dichlorophenyl tetrazolium chloride), diphenylene bis 5(2,3 dichlorophenyl tetrazolium chloride), diphenylene bis 2(3,5 dichlorophenyl tetrazolium chloride), 2-chlorophenyl 3-phenyl tetrazolium chloride, 2-chlorophenyl 3-phenyl 5-methyl tetrazolium chloride, 2-chlorophenyl 3-phenyl 5-propyl tetrazolium chloride, 2-chlorophenyl 3-phenyl 5-benzyl tetrazolium chloride, 2-chlorophenyl 3-phenyl 5-hexyl tetrazolium chloride, 2-chlorophenyl 3-phenyl 5-undecyl tetrazolium chloride, 2-chlorophenyl 3-phenyl 5-tolyl tetrazolium chloride, 2-chlorophenyl 3-phenyl 5-cyclohexyl tetrazolium chloride, 2-chlorophenyl 3-phenyl 5-cyclohexenyl tetrazolium chloride, phenylene bis 5(2-chlorophenyl 3-phenyl tetrazolium chloride), diphenylene bis 5(2-chlorophenyl 3-phenyl tetrazolium chloride), diphenylene bis 2(2-chlorophenyl 3-phenyl tetrazolium chloride), 2-methoxyphenyl 3-chlorophenyl tetrazolium chloride, 2-methoxyphenyl 3-chlorophenyl 5-methyl tetrazolium chloride, 2-methoxyphenyl 3-chlorophenyl 5-propyl tetrazolium chloride, 2-methoxyphenyl 3-chlorophenyl 5-benzyl tetrazolium chloride, 2-methoxyphenyl 3-chlorophenyl 5-hexyl tetrazolium chloride, 2-methoxyphenyl 3-chlorophenyl 5-undecyl tetrazolium chloride, 2-methoxyphenyl 5-tolyl tetrazolium chloride, 2-methoxyphenyl 3-chlorophenyl 5-cyclohexyl tetrazolium chloride, 2-methoxyphenyl 3-chlorophenyl 5-cyclohexenyl tetrazolium chloride, phenylene bis 5(2-methoxyphenyl 3-chlorophenyl tetrazolium chloride), diphenylene bis 5(2-methoxyphenyl 3-chlorophenyl tetrazolium chloride) diphenylene bis 2(2-methoxyphenyl 3-chlorophenyl tetrazolium chloride) 2,3-di-nitrophenyl tetrazolium chloride, 2,3-di-nitrophenyl 5-methyl tetrazolium chloride, 2,3-di-nitrophenyl 5-propyl tetrazolium chloride, 2,3-di-nitrophenyl 5-benzyl tetrazolium chloride, 2,3-di-nitrophenyl 5-hexyl tetrazolium chloride, 2,3-di-nitrophenyl 5-undecyl tetrazolium chloride, 2,3-di-nitrophenyl 5-tolyl tetrazolium chloride 2,3-di-nitrophenyl 5-cyclohexyl tetrazolium chloride, 2,3-di-nitrophenyl 5-cyclohexyl tetrazolium chloride, phenylene bis 5(2,3-di-nitrophenyl tetrazolium chloride), diphenylene bis 5(2,3-di-nitrophenyl tetrazolium chloride), diphenylene bis 2(3,5-di-nitrophenyl tetrazolium chloride), 2,3-dicarboxyphenyl tetrazolium chloride, 2,3-dicarboxyphenyl 5-methyl tetrazolium chloride, 2,3-dicarboxyphenyl 5-propyl tetrazolium chloride, 2,3-dicarboxyphenyl 5-benzyl tetrazolium chloride, 2,3-dicarboxyphenyl 5-hexyl tetrazolium chloride, 2,3-dicarboxyphenyl 5-undecyl tetrazolium chloride, 2,3-dicarboxyphenyl tetrazolium chloride, 5-tolyl tetrazolium chloride, 2,3-dicarboxyphenyl 5-cyclohexyl tetrazolium chloride, 2,3-dicarboxyphenyl 5-cyclohexenyl tetrazolium chloride, phenylene bis 5(2,3-dicarboxyphenyl tetrazolium chloride), diphenylene bis 5(2,3-dicarboxyphenyl tetrazolium chloride), diphenylene bis 2(3,5-dicarboxyphenyl tetrazolium chloride), 2,3-di-methoxyphenyl tetrazolium chloride, 2,3-di-methoxyphenyl 5-methyl tetrazolium chloride, 2,3-di-methoxyphenyl 5-propyl tetrazolium chloride, 2,3-di-methoxyphenyl 5-benzyl tetrazolium chloride, 2,3-di-methoxyphenyl t-hexyl tetrazolium chloride, 2,3-di-methoxyphenyl 5-undecyl tetrazolium chloride, 2,3-di-methoxyphenyl 5-tolyl tetrazolium chloride, 2,3-di-methoxyphenyl 5-cyclohexyl tetrazolium chloride, 2,3-di-methoxyphenyl 5-cyclohexenyl tetrazolium chloride, phenylene bis 5(2,3-di-methoxyphenyl tetrazolium chloride), diphenylene bis 5(2,3-di-methoxyphenyl tetrazolium chloride), diphenylene bis 2(3,5-di-methoxyphenyl tetrazolium chloride), 2,5 di-phenyl 3-pyrazyl tetrazolium chloride, 2,β-pyridyl 3,5-diphenyl tetrazolium chloride, 2,3-diphenyl 5-furyl tetrazolium chloride, 2,3-diphenyl 5-thienyl tetrazolium chloride, 2,3,5-trithienyl tetrazolium chloride, 2,5-diphenyl 3-pteroyl tetrazolium chloride, 2,3,5-triphenyl tetrazolium chloride trisulfonic acid, 2,3,5-tricarboxyphenyl tetrazolium chloride, 2,3-diphenyl 5-arsenophenyl tetrazolium chloride, 2-naphthyl 3,5-diphenyl tetrazolium chloride, stilbene bis 2(3,5-diphenyl tetrazolium chloride), diphenyl butadiene bis 2(3,5, diphenyl tetrazolium chloride).

In accordance with the present invention it has been found that formazans or substituted formazans may be converted by oxidation into the corresponding tetrazolium salts very simply by treating the formazan with an oxidizing agent in an acidic aqueous medium using mixing or agitation to get the desired contact of the formazan with the oxidizing agent, the tetrazolium salt being readily formed under such conditions and recovered from the reaction zone. Two types of oxidizing agents have proved particularly valuable for these purposes including oxides of nitrogen produced for example by treatment of an aqueous solution of a nitrite such as an alkali metal or alkaline earth metal nitrite with an aqueous acid, inorganic or organic to give the desired anion as set forth above for the tetrazolium salt desired. Or chlorine formed for example by reaction of manganese dioxide with hydrochloric acid may be utilized as the oxidizing agent. Oxidizing agents of the character just set forth are desirably produced by the stated reactions in the presence of the formazan. The temperature at which the oxidation is carried out may vary from room temperature to 100° C. and will generally depend on the type of oxidizing agent being employed. Where the oxides of nitrogen are readily formed at approximately room temperatures as in the treatment of the stated nitrites with an acid such as hydrochloric acid, it is not necessary to apply heat to the oxidation zone, but the latter will usually heat up during the course of the reaction to moderate temperatures of the order of 50° to 60° C. Where the oxidizing agent is formed by reaction of the desired materials at elevated temperatures as for example in the use of nitric acid to produce the oxides of nitrogen or in the production of chlorine as the oxidizing agent for manganese dioxide and hydrochloric acid, the temperatures employed may be those of a boiling water bath.

It has been found that the oxidation process may be very effectively carried out when a liquid organic vehicle is present particularly a solvent for the tetrazolium derivative produced, the use of a vehicle or solvent enabling mixing or agitation to be carried out to produce the necessary contact with the aqueous solution of the sodium nitrite for example and the aqueous solution of the strong acid. Desirably the solvent employed is one which is substantially immiscible with water but in some cases as for example acetic acid it may be miscible. In Example 4 the solvent is actually an excess of glacial acetic acid and this is very necessary to secure complete reaction. Of course, glacial acetic acid is completely miscible with water. On the other hand when chloroform is used, it is a solvent which is completely immiscible with water and yet the reactions proceed satisfactorily since the oxide of nitrogen is soluble in this solvent. The main criterion for the solvent is that it should have some solvent action upon the formazan but need not dissolve it completely. On the other hand, however, it should be an excellent solvent for the tetrazolium salt and be present in the sufficient amount to give complete solution of the tetrazolium salt in the solvent. This is necessary both to secure good reaction and a good separation of the solution of the tetrazolium salt in the solvent, from the water which is present or evolved during the reaction. Even though the formazan is not completely dissolved in the organic vehicle used, there is generally sufficient solubility so that with agitation a complete reaction is obtained. By the utilization of such processes where liquid organic vehicles of the character set forth are present, excellent yields of substituted tetrazolium salts are obtained. For example amyl alcohol may be used as the solvent and a concentrated aqueous solution of sodium nitrite and concentrated hydrochloric acid employed for the oxidation of the formazan in the presence of the amyl alcohol.

As liquid organic vehicles or solvents that may be employed there may be mentioned alcohols including both primary, secondary, and tertiary alcohols for example butanol, pentanol, hexanol, benzyl alcohol, cyclohexanol and methyl cyclohexanol; halogenated compounds such as chloroform; acids such as acetic acid; esters including butyl acetate, in its several varieties such as n-butyl acetate, iso-butyl acetate, sec-butyl acetate, n-amyl acetate, sec-amyl acetate, similar propionates including n-butyl propionate, iso-butyl propionate, amyl propionate, lactates such as ethyl lactate, butyl lactate, and a variety of other solvents may be employed.

The tetrazolium salts may be reduced to formazans as for example by the treatment with a reducing agent illustrated by the more commonly employed reducing agents such as formaldehyde at a pH of over 7, glyoxal at a pH of over 7, hydrazine hydrate, hydroxylamine, enzyme systems, polyhydric phenols, aromatic polyamines and amino phenols and the like.

As pointed out above the bis-tetrazolium salts are particularly important for diagnostic and therapeutic use and they are preferably produced from polyarylcyclic derivatives illustrated by the following formulas:

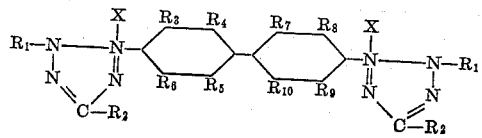

and also:

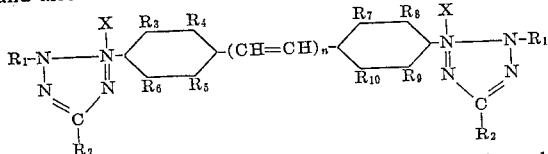

In these formulations $R_1$, $R_2$ and X may have the value and meaning as set forth above while the groups $R_3$, $R_4$, $R_5$, $R_6$, $R_7$, $R_8$, $R_9$, and $R_{10}$ may be alkyl, aryl, alkaryl, aralkyl, cycloaliphatic, halogen, sulfonic acid, phosphoric acid, arsenic groups and antimony groups such as arseno, arsono, stibino, stibono, etc., or the stated groups carrying substitutents; and $n$ is a positive integer such as 1, 2, etc.

The following examples will illustrate the invention the parts being by weight unless other indicated.

Example 1

860 cc. of denatured ethyl alcohol were mixed with 220 g. of phenyl hydrazine and 216 g. of benzaldehyde added. An exothermic reaction ensued with precipitation of benzaldehyde-phenylhydrazone. After standing for two hours, 860 cc. of pyridine were added and complete solution of the precipitate was effected.

191 g. of aniline were mixed with 220 cc. of ethyl alcohol and 520 cc. of 37.5% hydrochloric acid were added slowly. This solution was cooled to 0° C. and 147 g. of sodium nitrite dissolved in 200 cc. of water were added slowly with agitation to produce phenyl diazonium chloride, taking care to prevent the temperature from rising substantially over 0° C. After diazotization was completed, the solution was filtered free of suspended sodium chloride while keeping cold.

Keeping the temperature of the benzaldehyde-phenylhydrazone solution below 20° C., the cold phenyl diazonium chloride solution was added slowly to the former with constant stirring. After all of the phenyl diazonium chloride solution had been added, stirring was continued for an additional one or two hours and the mixture filtered. A dark red, solid triphenyl formazan was secured which was washed with water several times, filtered and dried. The yield was 514 g.

280 g. of the above triphenyl formazan were mixed with 1900 cc. of amyl alcohol. After stirring for a short while 150 g. of sodium nitrite dissolved in 200 cc. of water were added and the stirring continued very vigorously. 343 cc. of 37.5% hydrochloric acid solution were then added dropwise over a period of about 1½ hours. The solution become warm (50° C.) and the dark red color of the formazan disappeared, finally becoming yellow-orange. Stirring was allowed to proceed for 1½ hours longer and the solution then allowed to stand overnight. The upper alcohol layer was separated from the lower salt water layer and the alcohol steam distilled. The amyl alcohol was recovered, the triphenyl tetrazolium chloride remaining dissolved in the water formed by the condensing steam. While still hot the water solution was decanted from some insoluble tarry material which was then washed with water to remove any adhering triphenyl tetrazolium chloride. The combined water and washings were evaporated down to about ⅕ its original volume in a hot water bath or until some crystals began to form. The solution was then cooled down in an ice bath until a solid cake of cream colored crystals had formed. This was suction filtered and redissolved in the minimum amount of boiling water which would give a clear solution and the solution brought to pH 4.5 with ammonia, then 20 g. of activated carbon was added for each 100 g. of crude triphenyl tetrazolium chloride crystals and the solution boiled for 10 minutes. After filtering off the activated carbon another 35 g. of activated carbon were added and the solution boiled for an additional 10 minutes. The activated carbon was completely removed and the clear hot solution cooled in an ice bath. A solid crystalline cake of white crystals were obtained which was filtered and then dried at room temperature in a dessicator. Yield: 100 g. dry triphenyl tetrazolium chloride.

Example 2

One gram of triphenyl formazan was mixed with 12 cc. of chloroform and while agitating 0.46 g. of sodium nitrite dissolved in 0.50 cc. of water was added. 1.33 cc. of concentrated hydrochloric acid were added and the deep red color was discharged almost immediately. The salt water layer was removed from the chloroform solution and the chloroform evaporated under a vacuum leaving a viscous residue. The residue was washed with anhydrous acetone. This treatment dissolved the soft tars and left the light tan crystals of triphenyl tetrazolium chloride.

Example 3

10 g. of triphenyl formazan were mixed with 60 g. of amyl alcohol and 9 cc. of 37.5% hydrochloric acid. Then with agitation 3.4 g. of sodium nitrite dissolved in 3.75 cc. of water were added slowly. The reaction was more violent than in Example 1 where the order of addition of the reagents was reversed. The red color of the formazan was discharged rapidly.

Example 4

10 g. of triphenyl formazan were mixed with 60 g. of glacial acetic acid and 5 g. of solid powdered sodium nitrite were slowly added with agitation. The red color of the formazan was discharged to a yellow-orange. The salt which formed was removed by filtration. The filtrate was concentrated by evaporation under vacuum leaving a mixture of crystals and syrup. This was washed with anhydrous acetone several times leaving light tan crystals of triphenyl tetrazolium acetate.

Example 5

Benzaldehyde-phenylhydrazone solution in alcohol and pyridine was made as in Example 1 except that the following proportions were used:

860 cc. ethyl alcohol
202 g. phenyl hydrazine
199.5 g. benzaldehyde
860 cc. pyridine 172 g. of benzidine were mixed with 290 cc. of ethyl alcohol and 540 cc. of 37 to 38% hydrochloric acid. The mixture was heated to form the dihydrochloride and produce a homogeneous slurry. This was then cooled to below 0° C. and 144 g. of sodium nitrite dissolved in 200 cc. of water were added slowly with agitation keeping the temperature at or below 0° C. When the tetrazotization was complete the solution was stirred for an additional hour maintaining the temperature at or below 0° C.

The latter solution was added slowly with stirring to the solution of benzaldehyde-phenylhydrazone while keeping the temperature of this solution at about 20° C. The solution became black with precipitation of a bluish violet formazan whose color in the solid form is black and whose color in dilute ethyl alcohol solution is violet. After stirring the mixture for about 4 hours, it was filtered and the precipitate washed several times with water and dried. The yield was 670 g.

335 g. of the above formazan were mixed with 1750 cc. of amyl alcohol and 137 g. of sodium nitrite dissolved in 407 cc. of water added. The mixture was vigorously stirred and 312 cc. of 37–38% hydrochloric acid solution added dropwise over a period of 2½ hours. The color in this time was changed from a black to an orange and the temperature rose to about 50° C. After stirring for an additional two hours the mixture was allowed to stand overnight. The alcohol layer was separated from the aqueous salt solution and the alcohol removed by steam distillation. The recovered alcohol may be reused. The aqueous layer was separated from the tars, treated with activated carbon to lighten the color and treated by either of two different processes in order to isolate the bis-tetrazolium chloride. (A) The hot solution is evaporated down to complete dryness and the light tan resinous appearing bis-tetrazolium chloride, removed and ground to a powder. (B) The hot solution is saturated with sodium chloride and cooled resulting in the precipitation of a soft resinous mass which, when cooled was separated from the salt solution and dried at about 30°–40° C. The hard, brittle resinous mass was then ground to a light tan powder. The bis-tetrazolium chloride was quite soluble in hot water and to the extent of about ½% in water at room temperature. It is readily soluble in alcohol and practically insoluble in anhydrous acetone.

Due to the fact that the bis-tetrazolium chloride is only soluble in water to a small extent, the tars are repeatedly treated with boiling water, the aqueous solution separated from the remaining tars, the solution substantially decolorized with activated carbon and the bis-tetrazolium chloride isolated by either of the two above methods.

Although the above bis-tetrazolium chloride probably contains a mixture of isomers, the most probable structure is that of:

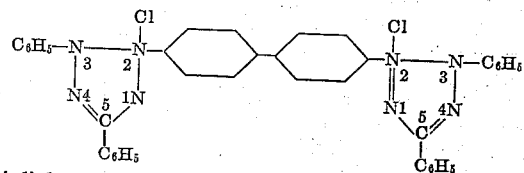

pp' diphenylene bis-2(3,5 diphenyl tetrazolium chloride).

Example 6

18.4 g. of benzidine were dissolved in 200 g. of glacial acetic acid by warming and 38 g. of 37–38% hydrochloric acid added. The solution was cooled to 5° C. and 15.3 g. of powdered sodium nitrite added over a period of ½ hour, maintaining the temperature at 5° C. or below and with agitation. A clear diazonium solution was obtained which was kept cold.

21.6 g. of phenyl hydrazine were dissolved in 100 g. of dioxan and 21.2 g. of benzaldehyde added. After standing for several hours 304 g. of pyridine were added.

The diazonium solution was added slowly to the benzaldehyde-phenylhydrazone solution over a period of ½ hour, with agitation and keeping the temperature below 25° C. The mixture was then allowed to stand for 4 to 5 hours. It was filtered, the precipitate washed with water several times and dried. A 25.5 g. yield of black formazan was obtained.

Example 7

25 g. of dimethyl amino benzaldehyde were dissolved in 200 cc. of dioxan and 191 g. ethyl alcohol. 18.1 g. of phenyl hydrazine were added and the solution heated under a reflux condenser at boiling. The dimethyl amino benzaldehydephenyl-hydrazone precipitated during heating. The mixture was cooled and 119 g. of pyridine added.

15.4 g. of benzidine were dissolved in 38 cc. of dioxan, 42 g. of 37–38% hydrochloric acid and 100 g. of water by heating. The solution was cooled to 5° C. and 12.7 g. of sodium nitrite dissolved in 15 g. of water were added slowly with agitation while maintaining the temperature at 5° C. or below. After all the sodium nitrite had been added the solution was kept cold and allowed to stand for 2 hours then vacuum filtered while keeping cold.

The tetrazotized benzidine solution was added slowly to the dimethyl amino benzaldehyde-phenylhydrazone mixture with agitation and keeping the temperature at 20° C. After filtration, and washing an orange-red formazan was obtained. This was oxidized after the process described in Example 1 to give a light-colored tetrazolium salts.

Example 8

49.7 g. of phenylhydrazine were dissolved in 894 cc. of ethyl alcohol and 49 g. of benzaldehyde were added. After standing for several hours 250 cc. of pyridine were added to produce a clear solution.

66 g. of dianisidine and 696 cc. of water were made into a paste and 46.4 cc. of 37–38% hydrochloric acid added. A clear solution was obtained on warming. 47.7 cc. more of 37–38% hydrochloric acid were added and the mixture cooled to 10° C. 35 g. of sodium nitrite dissolved in 92.8 cc. of water were added slowly to the dianisidine hydrochloride solution with stirring and cooling.

The clear cold tetrazotized dianisidine solution was added with stirring slowly to the benzaldehyde-phenylhydrazone solution keeping the temperature at about 20° C. A tarry soft blue-black bis-formazan separated. The yield of the dried material was 155 g.

155 g. of the bis-formazan were mixed with 1100 cc. of amyl alcohol and 83 g. of sodium nitrite dissolved in 111 cc. of water were added. Then with vigorous agitation 190 cc. of 37–38% hydrochloric acid were added dropwise. An exothermic reaction resulted, the temperature rising to about 60° C. and the color changing from blue-black to brown. The solution was stirred for an additional two hours and then allowed to stand overnight. The alcohol solution was separated from the aqueous sodium chloride and then steam distilled to remove the alcohol. The hot aqueous solution of bis-tetrazolium salt was separated from the tars, lightened with activated carbon filtered and evaporated to dryness. A pale yellow bis-tetrazolium chloride was obtained which was soluble in water to the extent of at least 0.5%. Additional bis-tetrazolium chloride could be removed from the tars by repeated extraction with boiling water and evaporation. The bis-tetrazolium chloride was capable of reduction to a blue-black formazan whose dilute alcoholic solution was blue-violet.

Example 9

82 cc. of amyl alcohol were mixed with 11 g. of pp' diphenylene bis-diphenyl formazan produced in Example 5 and 11 cc. of concentrated nitric acid and 33 cc. of water added. The mixture was stirred and heated under a reflux condenser on a boiling water bath. An exothermic reaction occurred and the violet-black mixture turned light brown. The alcohol layer was separated from the aqueous layer and the alcohol solution concentrated under a vacuum. The resulting thick syrup was washed with acetone to give a light brown microcrystalline mass of pp' diphenylene bis 2-(3,5 diphenyl tetrazolium) nitrite. This was soluble in water to some extent and could be reduced to the violet-black formazan.

Example 10

37 g. of 4,4' diaminostilbene disulfonic acid were treated with 70 g. of 37–38% hydrochloric acid and 40 g. of ethyl alcohol. The mixture was cooled to 0° C. and 14.2 g. of sodium nitrite dissolved in 20 cc. of water were slowly added with stirring and maintaining the temperature below 5° C.

53.7 of benzaldehyde-phenylhydrazone were dissolved in 110 cc. of pyridine and 110 cc. of ethyl alcohol. The above diazonium salt was added to this solution slowly with agitation maintaining the temperature below 25° C. A deep red bis-formazan was produced. This was oxidized by the process described in Example 5 to a pale tan water soluble bis-tetrazolium salt capable of being reduced to a deep red bis-formazan.

Example 11

29.9 g. of the bis-formazan produced in Example 5 were mixed with 200 cc. of amyl alcohol and 19 g. of 85% manganese dioxide. 58.7 g. of 37–38% hydrochloridic acid solution were added and the mixture stirred vigorously and heated. The black color of the mixture slowly changed to a green. The manganese salts were removed by washing and filtration leaving a brown amyl alcoholic solution. This was steam distilled and treated according to the procedure described in Example 5 to obtain the pp' diphenylene bis 2(3,5 diphenyl tetrazolium chloride).

The formazans set forth above are primarily and essentially utilized for the production of corresponding tetrazolium salts. The tetrazolium salts are valuable for utilization in a variety of ways and for a number of different purposes including their utilization in therapeutic and diagnostic work where they yield intensely colored reduction products formed in vivo having a color different from human and animal blood and tissue as is true particularly of the polycyclic bis-tetrazolium salts set forth above. Such substituted tetrazolium salts exhibit reduced toxicity in the animal and human body and also exhibit pronounced bacteriostatic properties.

Combinations of the various formazan and tetrazolium salts given above in the form of sulfa drugs may be employed, for example: di-sulfamidophenyl, phenyl formazan; sulfamidophenyl, di-phenylformazan; di-sulfapyridylphenyl, phenyl formazan; di-sulfapyrazylphenyl, phenyl formazan; sulfapyridylphenyl, diphenyl formazan; di-sulfamidophenyl methyl formazan, etc; 2,3-di-sulfamidophenyl, 5-phenyl tetrazolium chloride; 2-sulfamidophenyl, 3,5-diphenyl tetrazolium chloride; 2,3-di-sulfapyridylphenyl, 5-phenyl tetrazolium chloride; 2,3-sulfapyrimidylphenyl, 5-phenyl tetrazolium chloride; 2,3-di-sulfapyrazylphenyl, 5-phenyl tetrazolium chloride; 2-sulfapyridylphenyl, 3,5-diphenyl tetrazolium chloride; 2,3-di-sulfamidophenyl, 5-methyl tetrazolium chloride, etc.

Having thus set forth our invention, we claim:

1. The method of producing a tetrazolium salt which comprises agitating a formazan with an organic liquid solvent for the tetrazolium salt in the presence of an oxidizing agent in an acidic aqueous medium to form a tetrazolium salt.
2. The method as set forth in claim 1 in which the oxidizing agent is oxides of nitrogen.
3. The method as set forth in claim 1 in which the oxidizing agent is a water soluble nitrite.
4. The method as set forth in claim 1 in which the oxidizing agent is chlorine.
5. The method as set forth in claim 1 in which the oxidizing agent is manganese dioxide and the acid in the acidic aqueous medium is hydrochloric acid.
6. The method as set forth in claim 1 in which the liquid organic vehicle is at least a partial solvent for the formazan.
7. The method as set forth in claim 6 in which the oxidizing agent is oxides of nitrogen.
8. The method as set forth in claim 6 in which the oxidizing agent is a water soluble nitrite.
9. The method as set forth in claim 6 in which the oxidizing agent is chlorine, formed from manganese dioxide and hydrochloric acid.
10. The method as set forth in claim 1 in which the formazan contains a polycyclic aryl radical attached to a terminal nitrogen.
11. The method of producing a tetrazolium salt which comprises producing a formazan having a polycyclic aryl radical attached to a terminal nitrogen and agitating the formazan with an organic liquid solvent for the tetrazolium salt in the presence of an oxidizing agent in an acidic aqueous medium to form a tetrazolium salt.
12. The tetrazolium salt having a polycyclic aryl radical attached to nitrogen in the 2 position only.
13. The tetrazolium salt set forth in claim 12 in which the polycyclic aryl radical is diphenyl.
14. The arylene bis tetrazolium salt.
15. A compound selected from the group consisting of the tetrazolium salt having a polycyclic aryl radical attached to nitrogen in the 2-position only, and an arylene bis-tetrazolium salt, different from the first mentioned tetrazolium salt.
16. As a new compound, pp' diphenylene bis-2(3,5 diphenyl tetrazolium chloride).
17. As a new compound, pp' dimethoxydiphenylene bis-2(3,5 diphenyl tetrazolium chloride).
18. The method as set forth in claim 1 in which the formazan is pp' diphenylene bis-2(3,5 diphenyl formazan).
19. The method as set forth in claim 1 in which the formazan is pp' dimethoxydiphenylene bis-2(3,5 diphenyl formazan chloride).
20. The tetrazolium salts having a polycyclic aryl radical attached to nitrogen in the 2-position.

References Cited in the file of this patent

Weygand, Zeit. Naturforsch, 3b, 377–9 (1948).
Mattson et al., Jr. Am. Chem. Soc. 70, p. 1284 (1948).
Chemical Abstract, vol. 40, p. 1319[1].
Chemical Abstract, vol. 36, p. 1915[3].
Science, June 18, 1948, p. 13.
Mattson, Science, 106, pp. 294–5 (1947).
Breusch et al., Chem. Abstracts, vol. 40, col. 1319 (1946).
Ludolphy, Diplomarbeit, University of Heidelberg (1947), pp. 1–10.
Antopol, Public Health Reports, vol. 63, pp. 1231–38, Sept. 17, 1948.
Science, June 22, 1951, pp. 751–4 citing Public Health Repts. 63, 1231 (Sept. 17, 1948) in note 53 at page 754.
Bielig, Zeitschrift fur Naturforschung, Band 4b— April–May, 1949, pp. 21–23 citing in note 4 at page 21 the thesis of E. Ludolphy from the University of Heidelberg (1947).
Geschickter, J. A. M. A., Feb. 1, 1930 P. O. S. L., pp. 326–328.
J. A. M. A., vol. 94, No. 23, pp. 1845, 1864, 1865 P. O. S. L. June 7, 1930.
Kaplan, Am. J. Cancer, January 1932, pp. 210–213.